(12) United States Patent
Neal et al.

(10) Patent No.: US 6,682,112 B2
(45) Date of Patent: Jan. 27, 2004

(54) COMPACT COOKING TOOL APPARATUS

(75) Inventors: Ryan Neal, Midland, GA (US);
Andrew Kahler, Fortson, GA (US);
Kenneth Jordan, Columbus, GA (US);
Ken Richied, Middletown, OH (US);
Rick Nuchols, Loveland, OH (US);
Mike Rowe, Kettering, OH (US)

(73) Assignee: W. C. Bradley Company, Columbus, GA (US)

( * ) Notice: Subject to any disclaimer, the term of this patent is extended or adjusted under 35 U.S.C. 154(b) by 0 days.

(21) Appl. No.: 10/215,839

(22) Filed: Aug. 9, 2002

(65) Prior Publication Data

US 2003/0030291 A1 Feb. 13, 2003

Related U.S. Application Data

(60) Provisional application No. 60/311,489, filed on Aug. 10, 2001.

(51) Int. Cl.⁷ .................................. A47J 43/28
(52) U.S. Cl. .................. 294/7; 294/3; 7/112
(58) Field of Search .................. 294/2, 3, 7, 8, 294/9, 10, 11, 24, 51, 55.5; 30/123, 150, 342; 7/109, 110, 112, 167, 168

(56) References Cited

U.S. PATENT DOCUMENTS

| 854,745 | A | * | 5/1907 | King | 30/150 |
| 3,906,632 | A | * | 9/1975 | Oppenheimer | 294/7 |
| 4,823,419 | A | * | 4/1989 | Stimpson | 294/2 |
| 4,955,971 | A | * | 9/1990 | Goulter | 294/3 |
| 5,206,998 | A | * | 5/1993 | Oriente et al. | 294/10 |
| 5,774,994 | A | * | 7/1998 | Stein et al. | 294/7 |
| 5,934,721 | A | * | 8/1999 | Walde | 294/3 |

* cited by examiner

*Primary Examiner*—Dean J. Kramer
(74) *Attorney, Agent, or Firm*—James W. Kayden; Thomas, Kayden, Horstemeyer & Risley, LLP

(57) ABSTRACT

A compact cooking tool apparatus, comprises a handle having a first end and a second end. The handle is movable between an open position and a closed position. At least one cooking tool is adapted to extend from an end of the handle. The cooking tool is movably fixed to the handle. The handle is adapted to receive the cooking tool therein.

7 Claims, 4 Drawing Sheets

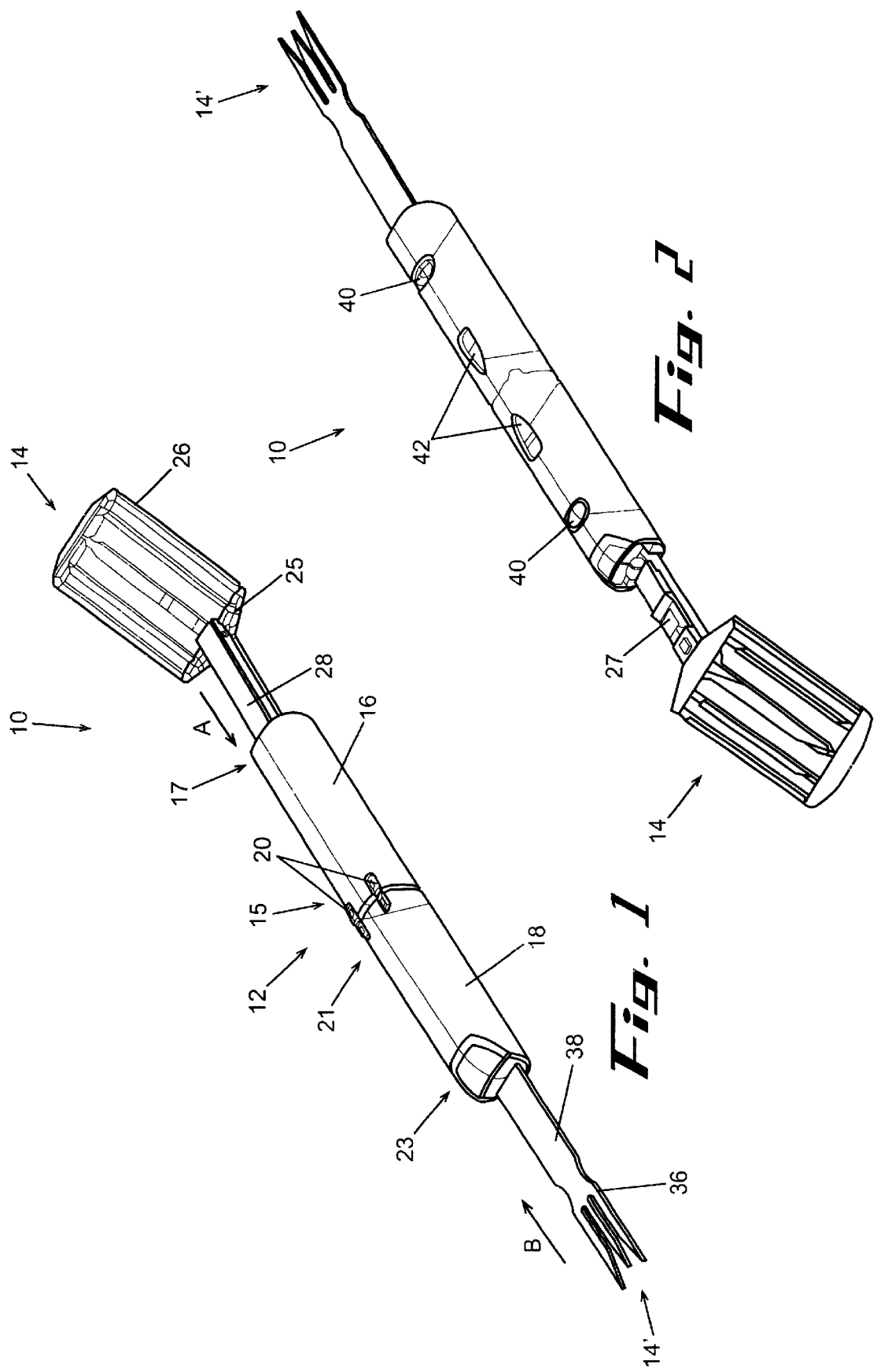

COMPACT COOKING TOOL APPARATUS

CROSS-REFERENCE TO RELATED APPLICATION

This application claims priority to U.S. provisional application entitled, "Compact Cooking Tool Apparatus," having ser. No. 60/311,489, filed Aug. 10, 2001, which is entirely incorporated herein by reference.

BACKGROUND OF THE INVENTION

1. Field of the Invention

This invention relates generally to cooking tools. More particularly, the present invention relates to a compact cooking tool apparatus.

2. Background

Cooking generally requires the use of various utensils for handling and cooking the food as well as cleaning the apparatus used to cook the food. While grilling is no exception, grilling commonly uses the same four to six utensils, regardless of whether the grill is being used to cook meats or vegetables. Grilling is not only as widespread and popular as any other form of cooking, it has become very versatile. Grills can be heated by gas, charcoal, or electricity and can be used indoors or outdoors. Grills can also be compact and portable, allowing them to be taken along when travelling, camping, tailgating, or the like. Regardless of how or where the food is grilled, the selected heat source for the grill, or with which heat source the user grills, more than likely the user will need a plurality of utensils to handle and cook the food and to care for the grill. These utensils can include, for example, a spatula to flip or turn the food product; tongs to handle the food, such as for removal or placement of the food products onto the grill; a fork for manipulating the food product; a brush for brushing on barbecue sauce, or the like; and a scraper or brush for cleaning residue off the grill before and after cooking. It is desirable that the tools used while grilling include a somewhat elongated handle such that the user can keep a reasonable distance from the heat while working with the food or cleaning the cooking surface. These tools are awkward and space consuming to store and transport. As such, grilling requires the care, maintenance and keeping track of a variety of tools and utensils that are usually relatively large and unwieldy. When using a portable grill, the need for a plurality of tools results in an excess of rather awkward tools and utensils to transport with the grill.

Thus, a heretofore unaddressed need exists in the industry to address the aforementioned deficiencies and inadequacies.

SUMMARY OF THE INVENTION

Preferred embodiments of the present invention provide a compact cooking tool apparatus. Briefly described, in architecture, one embodiment of the apparatus can be implemented as follows. A compact cooking tool apparatus comprises a handle having a first end and a second end. The handle is movable between an open position and a closed position. At least one cooking tool is adapted to extend from an end of the handle. The cooking tool is movably fixed to the handle. The handle is adapted to receive the cooking tool therein.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 1 illustrates a top perspective view of an embodiment of the compact cooking tool apparatus of the present invention.

FIG. 2 illustrates a bottom perspective view of an embodiment of the compact cooking tool apparatus illustrated in FIG. 1.

DETAILED DESCRIPTION OF THE PREFERRED EMBODIMENTS

Figure 3:
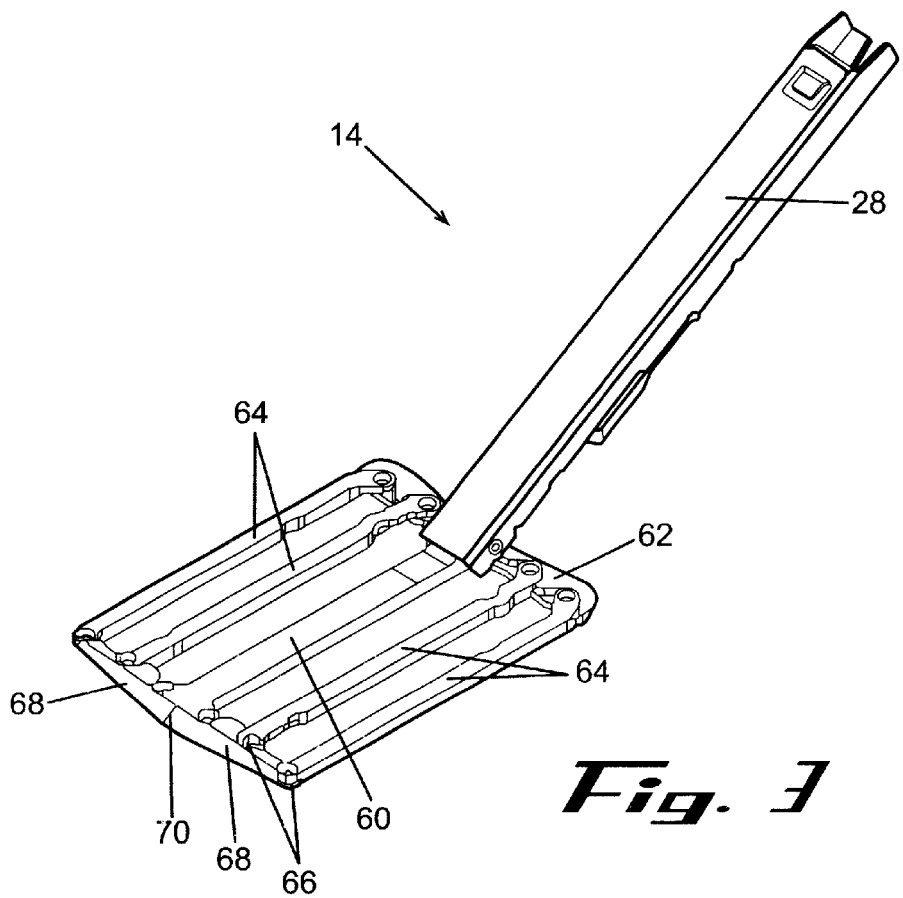
FIG. 3 illustrates a perspective view of an embodiment of a spatula head of the compact cooking tool apparatus illustrated in FIG. 1.

As disclosed herein, embodiments of the compact cooking tool apparatus 10 are adapted to manipulate food. Referring first to FIG. 1, generally, the compact cooking tool apparatus 10 comprises a handle 12 and at least one cooking tool 14, 14' connected thereto and adapted to extend therefrom and, alternatively, be disposed therein.

The handle 12 comprises a first handle portion 16 and a second handle portion 18. The first handle portion 16 is defined by a first proximal end 15 and a first distal end 17. Similarly, the second handle portion 18 is defined by a second proximal end 21 and a second distal end 23. The first handle portion 16 is hingedly connected toward the first proximal end 15 to the second proximal end 21 of the second handle portion 18.

More specifically, and with continued reference to FIG. 1, first handle portion 16 includes a cooking tool 14 adapted to extend from the first distal end 17. In one embodiment, the cooking tool 14 comprises a spatula head 26 and a spatula head extension 28. The spatula head 26 is disposed on the spatula head extension 28. The spatula head extension 28 is movably fixed to the first handle portion 16 such that the spatula head 26 and the spatula head extension 28 can be disposed within the first handle portion 16. For example, the spatula head extension 28 can be slidably fixed to the first handle portion 16 such that the spatula head 26 and the spatula head extension 28 can be slid in direction A into the first handle portion 16 for storage or when not in use.

Similarly, the second handle portion 18 includes an additional cooking tool 14' adapted to extend from the second distal end 23 of the second handle portion 18. In one embodiment, the cooking tool 14' comprises a fork head 36 and a fork head extension 38. The fork head 36 is disposed on the fork head extension 38. The fork head extension 38 is movably fixed to the second handle portion 18 such that the fork head 36 and the fork head extension 38 can be disposed within the second handle portion 18. For example, the fork head extension 36 can be slidably fixed to the second handle portion 18 such that the fork head 36 and the fork head extension 38 can be slid in direction B into the second handle portion 18 for storage or when not in use.

Referring now to FIG. 2, the first handle portion 16 and the second handle portion 18, illustrated in FIG. 1, both comprise a cooking tool latch 40. The cooking tool latch 40 releasably fixes the cooking tool 14, 14' in an extended position, as illustrated in FIGS. 1 and 2. The cooking tool latch 40 can comprise any suitable locking means known to one of ordinary skill in the art. For example, the cooking tool latch 40 can be adapted to engage a portion of the cooking tool 14, 14' when the cooking tool 14, 14' is in a fully extended position. Upon depressing the latch 40, a portion of the latch 40 disengages a portion of the cooking tool 14, 14' such that the cooking tool 14, 14' can be at least partially retracted and disposed in at least a portion of the handle 12. In another embodiment, the cooking tool latch 40 can releasably fix the cooking tool 14, 14' in position as retracted into the handle 12. In another embodiment, the cooking tool latch 40 can act to releasably fix the cooking tool 14, 14' in the retracted and extended position while allowing the cooking tool 14, 14' to be moved between an extended position and a retracted position.

Figure 4:
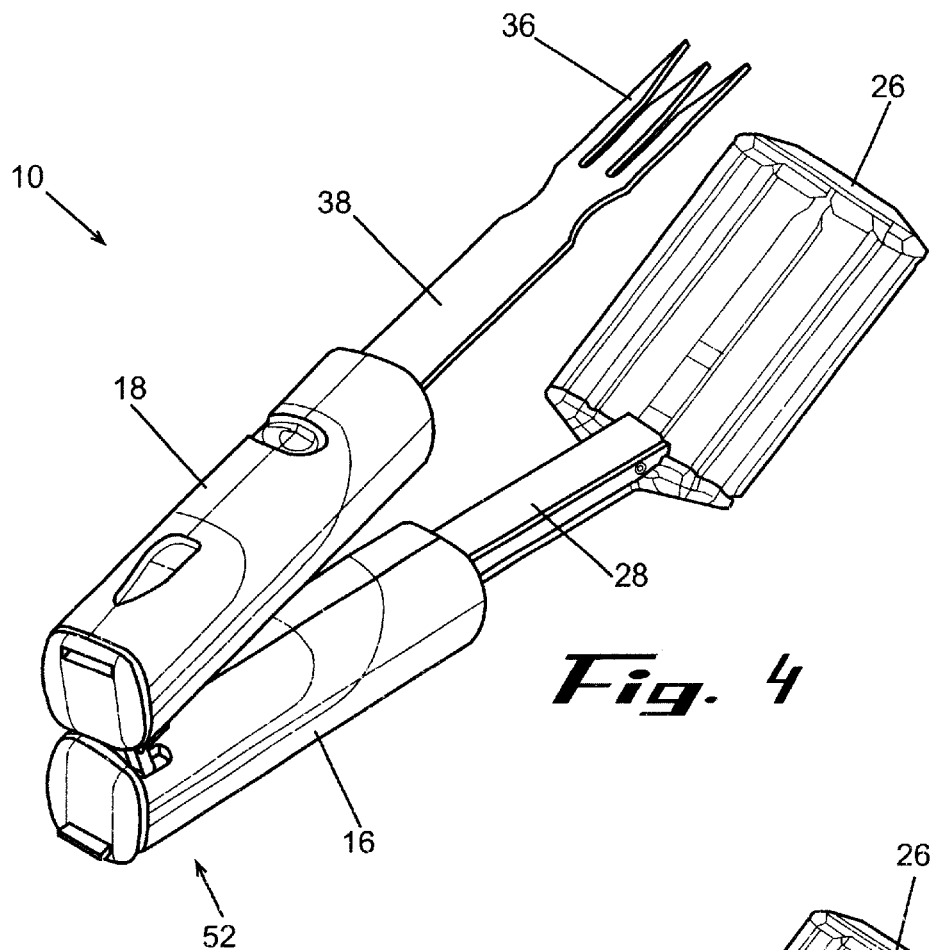
FIG. 4 illustrates a perspective view of an embodiment of the compact cooking tool apparatus illustrated in FIG. 1.

The compact cooking tool apparatus 10 can also comprise a handle release 42. As illustrated and discussed above, the handle 12 is formed of a first handle portion 16 and a second handle portion 18 connected together at a hinge 20. The handle 12 can be folded at the hinge 20 to a partially closed position 52 (see FIG. 4) such that the first handle portion 16 and the second handle portion 18 fold toward each other and the cooking tools 14, 14' extend in a substantially similar direction. The handle release 42 releasably locks the handle 12 in an open position 50. The handle release 42 can comprise any suitable release means known to one of ordinary skill in the art. For example, the handle release 42 can be adapted to engage a portion of the handle 12 when the handle 12 is in the open position 50. In one embodiment, upon depressing the release 42, a portion of the release 42 disengages a portion of the handle 12 such that the handle 12 can be moved into the partially closed position 52.

Figure 3A:
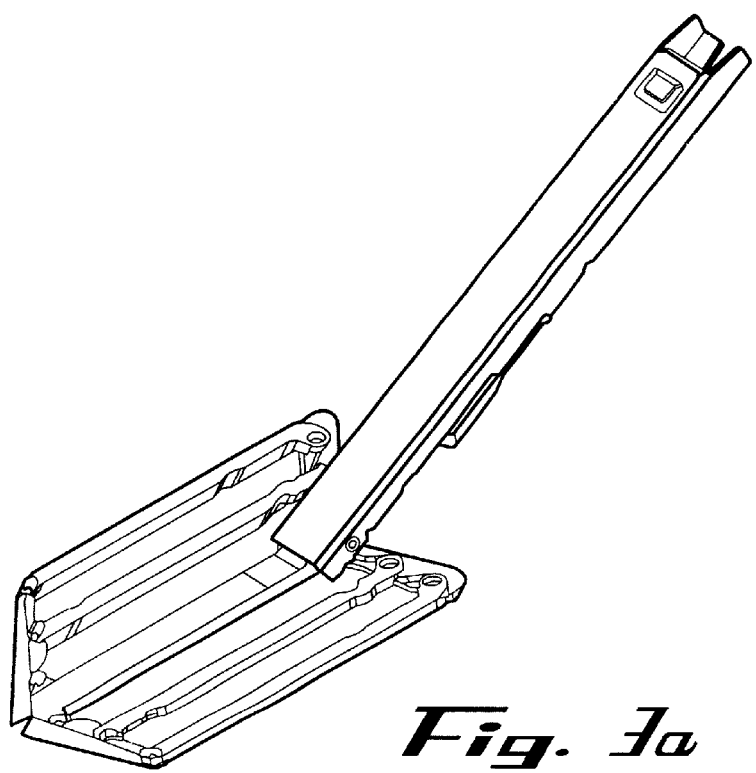
FIG. 3A illustrates a perspective view of an embodiment of a spatula head of the compact cooking tool apparatus illustrated in FIG. 1.

Referring next to FIGS. 3 and 3A, an embodiment of the spatula head 26 is shown. The spatula head 26 can be collapsed to reduce width such that the spatula head 26 can be slidably moved into the handle 12 along with the spatula head extension 28. In one embodiment, illustrated in FIG. 3, the spatula head 26 comprises a center beam 60 extending away from the spatula head extension 28. The center beam 60 is pivotally fixed to the spatula head extension 28 at the spatula hinge 25. A pair of support beams 62 are disposed at each end of the center beam 60 and substantially perpendicularly thereto. The center beam 60 is fixed to each support beam 62 at approximately the center of the support beams 62. Side beams 64, arranged substantially parallel to the center beam 60, span between the support beams 62 pivotally engaging the support beams 62 at points along the length thereof. As illustrated, a pair of side beams 64 are disposed on either side of the center beam 60; however, it should be understood that any suitable number of side beams 64 can be included without departing from the spirit of the present invention.

The side beams 64 are pivotally fixed to the support beams 62 at beam hinges 66. In one embodiment, each beam hinge 66 comprises a pin (not shown) inserted though a pair of aligned holes (not shown). One hole (not shown) being disposed toward an end of the side beam 64 and the other hole (not shown) being disposed in the support beam 62.

The support beams 62 comprise a pair of support beam portions 68 being hingedly connected together at a support beam hinge 70. The support beam hinge 70 is adapted to allow the support beam 62 to fold between an open position, where the length of the support beam 62 fully expands from the center beam 60, and a closed position, where the support beam portions 68 expand substantially along the center beam 60.

Width of the spatula head 26 is decreased by moving the support beams 62 into a closed position, as described above and illustrated in FIG. 3A. As the support beam portions 68 are moved about the support beam hinge 70 from an open position to a closed position, the side beams 64 pivot about the beam hinges 66. The side beams 64 move back and laterally inward toward the center beam 60 until the side beams 64 sit substantially flush together and with the center beam 60.

The spatula head 26 is preferably hingedly fixed to the spatula head extension 28 by a spatula hinge 25. The spatula hinge 25 allows the spatula head 26 to be adapted between two positions. In a first position, the plane of the spatula head 26 is disposed at an angle with respect to the spatula head extension 28. It is preferable that the angle between the spatula head 26 and the spatula head extension 28 is conducive to manipulating food product on a grill or other cooking surface. In a second position, the plane of the spatula head 26 is substantially aligned with the spatula head extension 28. It is preferable that the substantial alignment of the spatula head 26 with the spatula head extension 28 is conducive to disposing the spatula 26 and spatula head extension 28 within the handle 12.

An optional spatula hinge lock 27 (see FIG. 2) engages to releasably fix the spatula head 26 in at least one of the first position or the second position. The spatula lock 27 can be adapted to releasably fix the spatula head 26 in both the first position and the second position, alternatingly. The spatula hinge lock 27 can comprise any suitable lock means known to one of ordinary skill in the art that allows for angled movement of the spatula head 26 with respect to the spatula head extension 28 as well as releasably fixing the spatula head 26 in the first position and/or the second position.

In use, the compact cooking tool apparatus 10 can be arranged in various configurations. For example, and with reference to FIG. 4, the apparatus 10 can be disposed in a partially closed position 52. The spatula head extension 28 and fork head extension 38 are both extended from the handle 12. The spatula head 26 is disposed in an expanded configuration. The body hinge 20 is preferably spring loaded such that the apparatus 10 can be used as a pair of tongs.

Figure 5:
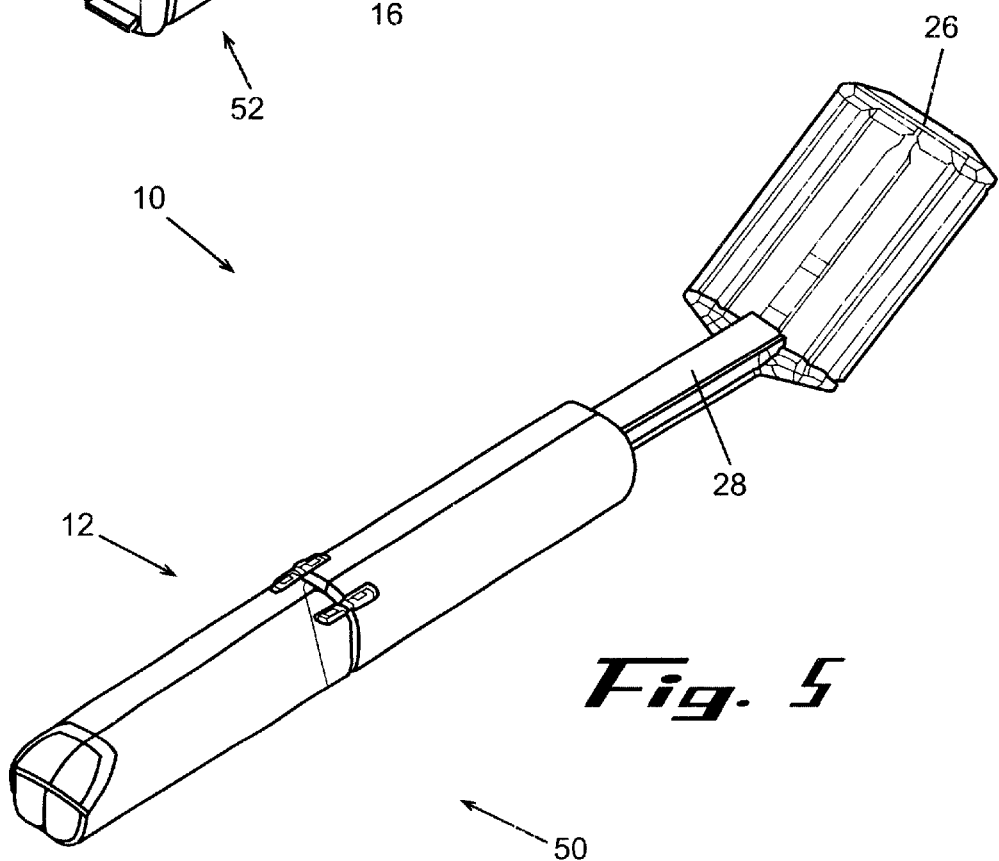
FIG. 5 illustrates a perspective view of an embodiment of the compact cooking tool apparatus illustrated in FIG. 1.

In another configuration, and with reference to FIG. 5, the apparatus 10 can be used as a spatula. In this configuration, the apparatus 10 is arranged in the open position 50. The fork head extension 38 (not shown) and fork head 36 (not shown) are disposed in the handle 12. Conversely, the spatula head extension 28 is fully extended from the handle 12 and the spatula head 26 is disposed in the expanded position.

Figure 6:
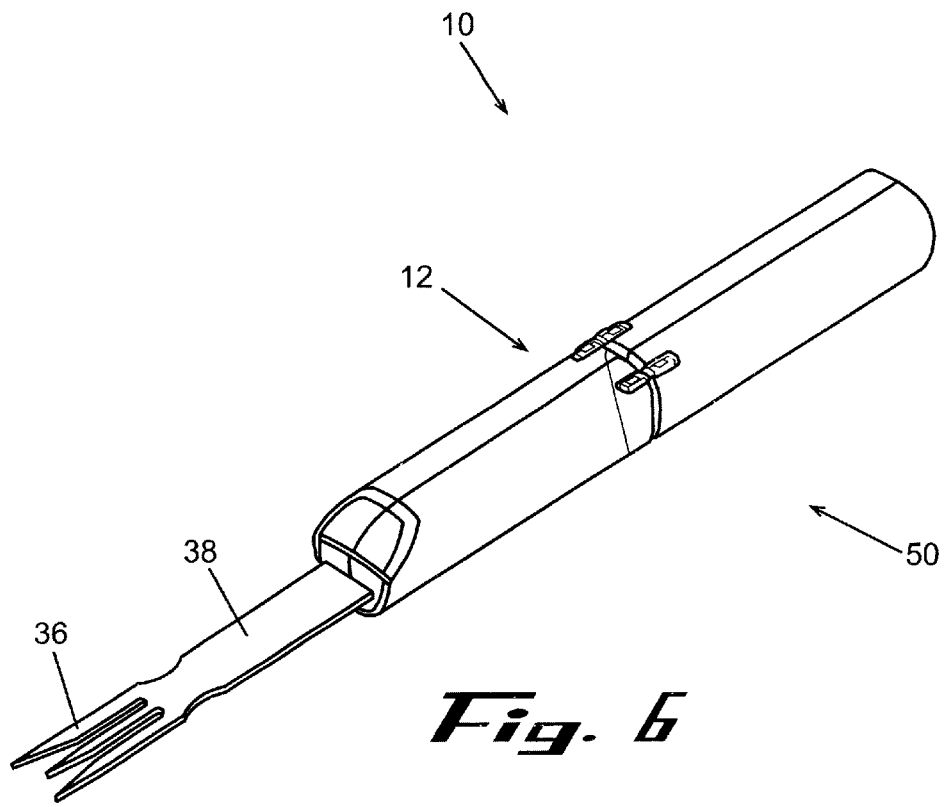
FIG. 6 illustrates a perspective view of an embodiment of the compact cooking tool apparatus illustrated in FIG. 1.

In another configuration, and with reference to FIG. 6, the apparatus 10 can be used as a fork. In this configuration, the apparatus 10 is arranged in the open position 50. The spatula head extension 28 is disposed in the handle 12. Similarly, the spatula head 26 itself is disposed in the collapsed position and also disposed within the handle 12. Conversely, the fork head extension 38 is extended from the handle 12.

Figure 7:
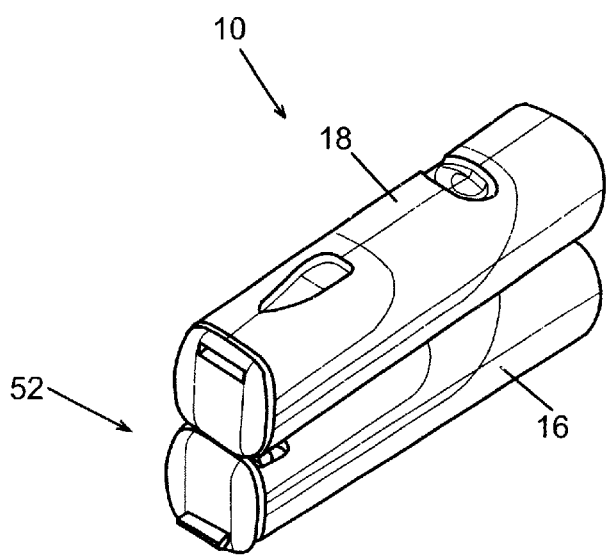
FIG. 7 illustrates a perspective view of an embodiment of the compact cooking tool apparatus illustrated in FIG. 1.

Referring next to FIG. 7, the fork head extension 38 and the fork head 36 are disposed in the handle 12 for storage. The spatula head 26 is disposed in the collapsed configuration and disposed in the handle 12 with the spatula head extension 28. The handle 12 is disposed in a closed position 52. An optional latch (not shown) can releasably fix the apparatus in the closed position 52.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without department substantially from the spirit and principles of the invention. All such modifications and variations are intended to be included herein with the scope of this disclosure and the present invention and protected by the following claims.

Therefore, having thus described the invention, at least the following is claimed:

1. A compact cooking tool apparatus, comprising:
   a handle having a first end and a second end, said handle being movable between an open position and a closed position; and
   a first cooking tool being movably fixed to said handle, said first cooking tool comprising a work surface and a work surface extension;
   wherein said handle is adapted to receive said work surface extension and at least a portion of said work surface of said first cooking tool therein and said first cooking tool is fixed to said handle such that said first cooking tool is movable into said handle.

2. The cooking tool apparatus of claim 1, wherein said handle further comprises:
   a first handle portion terminating at said first end of said handle;
   a second handle portion terminating at said second end of said handle; and
   a hinge connection hingedly fixing said first handle portion to said second handle portion, said first handle portion and said second handle portion being movable about said hinge connection thereby moving said handle between said open position and said closed position.

3. The cooking tool apparatus of claim 1, further comprising:
   a second cooking tool being movably fixed to said handle and arranged opposing said first cooking tool, said second cooking tool comprising a work surface and a work surface extension;
   wherein said handle is adapted to receive said work surface extension and at least a portion of said work surface of said second cooking tool therein.

4. A compact cooking tool apparatus of claim 3, wherein said work surface of said second cooking tool comprises a fork.

5. A compact cooking tool apparatus of claim 1, wherein said work surface of said first cooking tool comprises a spatula head.

6. A compact cooking tool apparatus of claim 5, wherein said spatula head is adapted to be adjustable between an expanded configuration, wherein the width of said spatula head is greater than a width of said handle, and a collapsed configuration, wherein the width of said spatula head is less than the width of said handle.

7. The compact cooking tool apparatus of claim 6, wherein said spatula head, being disposed in said collapsed configuration, is adapted to be slidably disposed within said handle.

* * * * *